Aug. 11, 1964 A. A. RICE 3,143,916

COLLAPSIBLE SELF-ANCHORING DEVICE

Filed April 3, 1962

INVENTOR
Arthur A. Rice
BY
ATTORNEY

United States Patent Office 3,143,916
Patented Aug. 11, 1964

3,143,916
COLLAPSIBLE SELF-ANCHORING DEVICE
Arthur A. Rice, Herricks, New Hyde Park, N.Y., assignor to A. A. Rice, Inc., Bayside, N.Y., a corporation of New York
Filed Apr. 3, 1962, Ser. No. 184,693
2 Claims. (Cl. 85—71)

This invention relates to a fastening device, and more particularly to a self-anchoring fastening device adapted to be lodged within the aperture of a workpiece of substantial porosity and thickness as, for example, plasterboard, concrete or the like, and adapted to receive, and securely retain a threaded member therein.

Generally self-anchoring fastening devices are limited in their applications to a workpiece having an aperture of relatively slight depth. This is so particularly because it has been found advisable to allow the major portion of the body of a fastening device to pass through and clear the thickness of a workpiece so that means ordinarily provided for anchorage on the "blind" side of a workpiece can be expanded and thus achieve anchorage. Where a workpiece, however, is of a substantial thickness, anchorage of the fastening device has been found difficult, if not impossible. Attempts at elongating the structure to meet varying thicknesses has resulted in a sharp loss of retentive strength of the anchoring characteristics of the device.

It is, therefore an object of the present invention to provide a self-anchoring fastening device which is adapted to be inserted in an aperture of a workpiece of substantial porosity and/or thickness which will secure itself against withdrawal and rotation, and which will be adapted to receive, grip and securely retain a threaded member passing therethrough.

Another object of the present invention is the provision of a fastening device which is adapted to be lodged within a predrilled aperture and effectively seal such aperture.

A further object of the present invention is to provide a self-anchoring device adapted to be lodged in the aperture of a workpiece having a substantial porosity and/or thickness and which will receive, retain and secure therein a conventional screw or bolt.

Another object of this invention is the provision of a self-anchoring device which may be installed in a workpiece where access thereto is from only one side.

Still another object of this invention is to provide a fastening device for securing panels or other appurtenances to a workpiece which is of a unitary construction and of light weight, yet which is capable of furnishing exceptionally powerful locking properties to a conventional bolt or screw.

In accomplishing the foregoing objects and advantages, there is provided a self-anchoring nut member formed of a suitable resilient material, which upon the application of slight pressure upon the sides thereof, will compress and snap into a preformed aperture of a workpiece. The member is provided with a head and body portions, each having aligned bores for receiving a screw member therethrough. A plurality of inner and outer rib structured connecting the head and body portions are adapted to flare outwardly as a screw, acting as a vise, is inserted in the bore of the fastening device. The inner rib structures are provided with inwardly disposed venturi like structures to reinforce the ribs, when in a flared position, against any outward pull. Cutting fins, provided in the head portion are additionally provided for firmly embedding the member within the workpiece to which attachment is made.

The above and further advantages of the present invention will be apparent to those versed in the art from the following description of the invention as illustrated in the drawings wherein like characters designate like parts in the several views, and in which.

Figure 1:
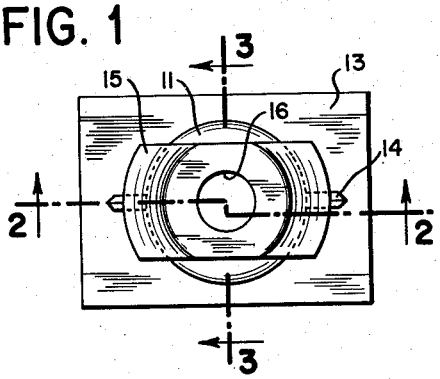
FIG. 1 is a top elevational view of the fastening device of the present invention.
Figure 4:
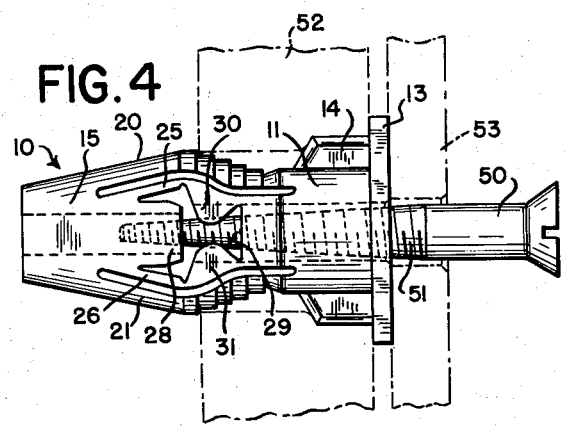
FIG. 4 is a view of the securing member of the present invention shown within the aperture of a workpiece and having a conventional screw therein.
Figure 2:
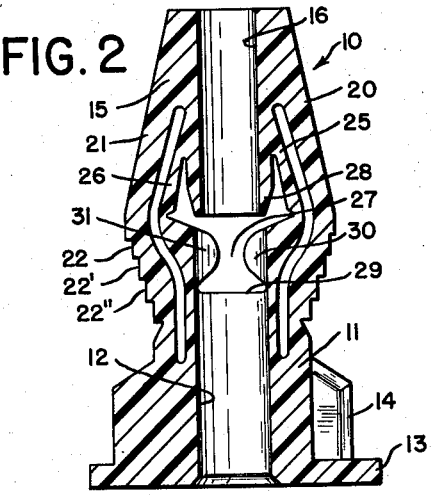
FIG. 2 is a front elevational view of the invention taken on line 2—2 of FIG. 1.
Figure 5:
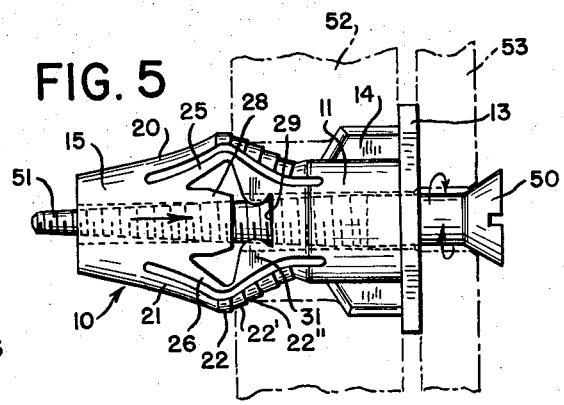
FIG. 5 is a view of the device as shown in FIG. 4 illustrating an intermediate stage of securement of the screw.
Figure 3:
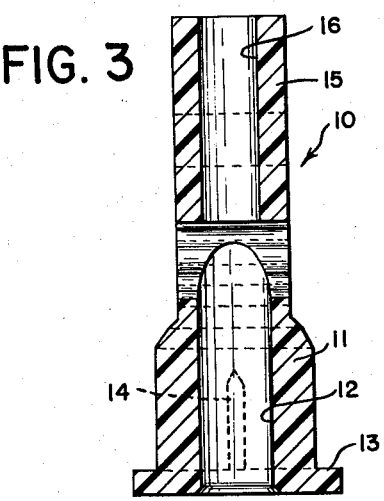
FIG. 3 is a view taken on line 3—3 of FIG. 1.

Referring now to the drawing, there is illustrated a fastening device employing a self-anchoring nut member 10, in conjunction with a self-boring screw 50 having a conventional threaded shank 51. Although a threaded self-boring screw 50 is shown in conjunction with the nut member 10, any conventional bolt or screw fitting may be used.

The self-anchoring nut member 10, made of zytel nylon or like resilient material comprises a head portion 11 having an axially extending non-threaded bore 12. A shoulder 13 at the rear end of said head portion 11 may assume a rectangular configuration as shown, or may be hexagonal, round, or assume any other convenient configuration extending from head portion 11, at the sides thereof, to shoulder 13, there is provided cutting fins 14 to facilitate embedding the self-anchoring nut 10 within a workpiece.

The body portion 15 is provided with an axially extending non-threaded bore 16 in alignment with bore 12, and generally narrower than bore 12.

A pair of outer rib members 20, 21 are integrally formed with head portion 11 at one end thereof, and with body portion 15 at the other end thereof. Said rib members 20, 21 are provided with a plurality of recessed collars 22, 22′, 22″, on the outer surface thereof, said recessed collars having progressively smaller diameters as they extend downwardly toward the head portion 11.

A pair of inner rib members 25, 26 integrally formed with said head portion at the top thereof, and extending to, and integrally formed with, the body portion 15, medially therealong, forms a central orifice 27. A shank portion 28 is provided at the lower part of the body portion 15, which is adapted to be seated upon the head portion 11 at point 29. Along the inner surface of inner rib members 25, 26, there is provided protuberances 30, 31 disposed inwardly within orifice 27 forming a venturi like structure within the central region of the nut 10.

Figure 6:
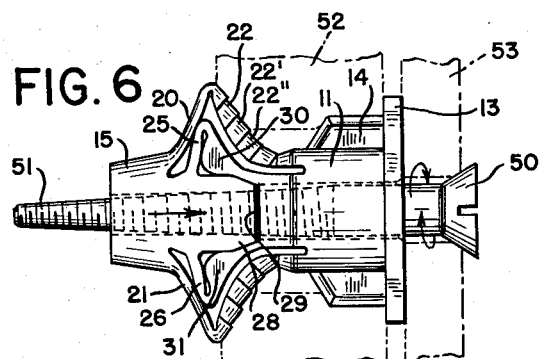
FIG. 6 is a view of the device as shown in FIG. 4 showing complete engagement of the screw therein and the fixture or other appurtenance being secured thereby.

Upon seating of nut member 10 within the aperture of workpiece 52, a screw is passed through a preformed aperture of a fixture 53 which is desired to be secured to the workpiece 52, and into bore 12. As screw 50 emerges into the central orifice 27, outward pressure is exerted upon protuberances 30, 31 causing it in turn to force rib members 25, 26 outwardly, and simultaneously forcing body portion 15 to move downwardly. The outward flare of rib inner member 25, 26 further causes outer rib members 20, 21 to flare outwardly so that a lock is effected within workpiece 52. As screw 50 moves progressively through body portion 15, body portion 15 is further moved toward head portion 11, effecting a collapse of nut 10 within the workpiece, the shank portion 28 is seated upon and thereby locked against head portion 11 at point 29, as illustrated in FIG. 6. It will be seen that protuberances 30 and 31 also act to support and maintain ribs 25, 26 in an outwardly flared position, and ribs 20, 21 in a singular position so that any with-drawing pull or force from without the fixture 53 will not dislodge nut 10 from the workpiece 52.

Although a specific embodiment has been described it will be evident that modifications may be made herein without departing from the scope of the present invention. For example, bores 12 and 16 may be threaded where a non-threading screw or bolt is utilized. Additionally, shoulders 13 may be inwardly beveled so that it may be countersunk within a workpiece if desired. It is also to be understood that the self-anchoring nut 10 may dispense with cutting fins 14 or alternatively may employ one or more fins as desired.

I claim:

1. A self-anchoring fastening device fabricated of a substantially resilient plastic material comprising:
 (a) a substantially annular head portion having an axially extending bore therethrough;
 (b) a substantially annular body portion having an axially extending bore therethrough; said bore being in alignment with the bore of said head portion and generally narrower than the bore through said head portion;
 (c) a pair of outer rib members integrally formed with said head portion at one end thereof and with said body portion at the other end thereof;
 (d) a pair of inner rib members integrally formed with said head portion at one end thereof and with said body portion at the other end thereof, said outer and inner rib member being in overlying spaced juxtaposed relationship;
 (e) a protuberance on each of said inner rib members along the inner surface thereof;
 (f) said inner rib members extending from said head portion at the forward end thereof to said body portion medially therealong to form a shank portion in said body portion, said shank portion being dimensioned in relation to and in cooperation with said protuberances to be seated upon and locked against said head portion; and
 (g) a central orifice form between said head portion and said body portion whereby said shank portion is seated upon the forward end of said head portion and said inner and outer ribs are outwardly flared upon the application of compression upon said fastening device.

2. A self-anchoring fastening device fabricated of a substantially resilient plastic material comprising:
 (a) a substantially annular head portion having an axially extending bore therethrough;
 (b) a substantially annular body portion having an axially extending bore therethrough; said bore being in alignment with the bore of said head portion and generally narrower than the bore through said head portion;
 (c) a pair of outer rib members integrally formed with said head portion at one end thereof and with said body portion at the other end thereof;
 (d) a pair of inner rib members integrally formed with said head portion at one end thereof and with said body portion at the other end thereof, said outer and inner rib member being in overlying spaced juxtaposed relationship;
 (e) a protuberance on each of said inner rib members along the inner surface thereof;
 (f) said inner rib members extending from said head portion at the forward end thereof to said body portion medially therealong to form a shank portion in said body portion, said shank portion being dimensioned in relation to and in cooperation with said protuberances to be seated upon the locked against said head portion;
 (g) a central orifice form between said head portion and said body portion whereby said shank portion is seated upon the forward end of said head portion and said inner and outer ribs are outwardly flared upon the application of compression upon said fastening device;
 (h) a shoulder at the rear of said head portion;
 (i) at least one cutting fin extending from the body of said head portion at the side thereof to said shoulder at the rear of said head portion;
 (j) a plurality of recessed collars along the outer surface of said outer rib members in the region of said head portion; and
 (k) said recessed collars being of successively smaller diameters as they extend toward said head portion.

References Cited in the file of this patent

UNITED STATES PATENTS

| | | |
|---|---|---|
| 2,236,079 | Wipper | Mar. 25, 1941 |
| 2,562,018 | Colley | July 24, 1951 |
| 2,887,926 | Edwards | May 26, 1959 |
| 2,997,910 | Tinnerman | Aug. 29, 1961 |
| 3,013,643 | Perry | Dec. 19, 1961 |
| 3,014,563 | Bratton | Dec. 26, 1961 |

FOREIGN PATENTS

| | | |
|---|---|---|
| 519,317 | Belgium | May 15, 1953 |